United States Patent
Korn (10) Patent No.: US 10,343,349 B2
(45) Date of Patent: Jul. 9, 2019

(54) SYSTEM, METHOD AND APPARATUS FOR 3D PRINTING

(71) Applicant: Stanley Korn, Culpepper, VA (US)

(72) Inventor: Stanley Korn, Culpepper, VA (US)

(*) Notice: Subject to any disclaimer, the term of this patent is extended or adjusted under 35 U.S.C. 154(b) by 174 days.

(21) Appl. No.: 14/672,296

(22) Filed: Mar. 30, 2015

(65) Prior Publication Data

US 2015/0273769 A1    Oct. 1, 2015

Related U.S. Application Data (60) Provisional application No. 61/972,355, filed on Mar. 30, 2014.

(51) Int. Cl.
| | |
|---|---|
| *B29C 64/106* | (2017.01) |
| *B29C 64/153* | (2017.01) |
| *B29C 64/386* | (2017.01) |
| *B29C 67/00* | (2017.01) |
| *B33Y 10/00* | (2015.01) |
| *B33Y 30/00* | (2015.01) |
| *B33Y 50/02* | (2015.01) |
| *B29K 101/12* | (2006.01) |

(52) U.S. Cl.
CPC ........ *B29C 67/0088* (2013.01); *B29C 64/106* (2017.08); *B29C 64/153* (2017.08); *B29C 64/386* (2017.08); *B29K 2101/12* (2013.01); *B33Y 10/00* (2014.12); *B33Y 30/00* (2014.12); *B33Y 50/02* (2014.12)

(58) Field of Classification Search
USPC ........ 118/313–315, 679–681, 410, 640–643; 425/113, 130, 131.1, 375; 219/121.73, 219/121.74, 121.75, 121.76; 347/14, 19
See application file for complete search history.

(56) References Cited

U.S. PATENT DOCUMENTS

| | | | |
|---|---|---|---|
| 5,508,489 A | | 4/1996 | Benda et al. |
| 6,280,785 B1 | * | 8/2001 | Yang .................... A21C 11/163 425/112 |
| 6,463,872 B1 | * | 10/2002 | Thompson .............. C03C 25/12 118/420 |
| 6,943,086 B2 | * | 9/2005 | Hongo ............... B23K 26/0648 219/121.76 |
| 2004/0175451 A1 | | 9/2004 | Maekawa et al. |
| 2004/0217186 A1 | * | 11/2004 | Sachs .................... B41J 2/1429 239/11 |

(Continued)

OTHER PUBLICATIONS

Written Opinion in corresponding PCT/US2015/023246.

*Primary Examiner* — Yewebdar T Tadesse
(74) *Attorney, Agent, or Firm* — Van Dyke Law; Raymond Van Dyke (57) ABSTRACT

The present invention is directed to three-dimensional printing techniques, methodologies, systems and apparatus to facilitate increased print speed. Through the use of multiple nozzles on a print head printing line by line, more material is deposited. By including nozzles sufficient for a line dimensional (or portion) of a page or planar element of an object design, the material deposition for an entire plane or layer is done line by line in one pass of the print head. Likewise, through the inclusion of multiple lasers, beams or energy sources more material can be cured, such as all along a contour line, instead of point by point.

28 Claims, 2 Drawing Sheets

(56) References Cited

U.S. PATENT DOCUMENTS

| | | | |
|---|---|---|---|
| 2004/0226929 A1* | 11/2004 | Miura | B41M 3/006 |
| | | | 219/121.85 |
| 2006/0156978 A1* | 7/2006 | Lipson | A61L 27/36 |
| | | | 118/708 |
| 2010/0215856 A1 | 8/2010 | Krtichman | |
| 2011/0021964 A1* | 1/2011 | Larsen | A61L 26/0066 |
| | | | 602/47 |
| 2013/0064706 A1 | 3/2013 | Schwarze et al. | |
| 2013/0170171 A1 | 7/2013 | Wicker et al. | |
| 2013/0193619 A1* | 8/2013 | Church | B29C 67/0081 |
| | | | 264/400 |
| 2014/0048970 A1 | 2/2014 | Batchelder et al. | |
| 2014/0120229 A1* | 5/2014 | Mantell | A23G 1/0066 |
| | | | 426/515 |
| 2014/0152383 A1* | 6/2014 | Nikonov | H01L 51/0004 |
| | | | 327/564 |

\* cited by examiner

SYSTEM, METHOD AND APPARATUS FOR 3D PRINTING

CROSS REFERENCE TO RELATED APPLICATION

The present invention is a non-provisional of and claims priority from U.S. Provisional Patent Application Ser. No. 61/972,355, filed Mar. 30, 2014, entitled "SYSTEM, METHOD AND APPARATUS FOR 3D PRINTER EXTRUSION," the subject matter of which is incorporated by reference herein.

BACKGROUND OF THE INVENTION

The explosive growth of three-dimensional printing has created a new paradigm of manufacturing for everyone. As the price of extrusion and other devices go lower, more and more people partake of the phenomenon with no end in sight, initiating a new age of manufacturing. Eventually these devices will be in every home and the creation or re-creation of three-dimensional objects will become as commonplace as Xerox copying.

Various conventional techniques of three-dimensional printing use a single head, for example, an extrusion head which deposits material as a point source onto a planar surface or a laser head that moves a laser point by point to cure or harden material. Typically, current 3D printing machines take many hours or perhaps days to deposit or process the materials necessary to instantiate a design, such as from a computer-aided design (CAD) or other program or code.

With further advances in this technology, the need arises for even more ways to improve the throughput and efficiencies of these revolutionary devices. Indeed, many new approaches and paradigms are still needed for this technology to make the leap from revolutionary to customary for a home, and the instant invention is such a paradigm.

There is, therefore, a need for devices, systems and methodologies to better the processes for three-dimensional printing techniques, e.g., increase the speed of additive creation and the speed of laser sintering, and better satisfy the growing needs of a populace eager to engage this new technology.

SUMMARY

The present invention is directed to techniques, systems, devices and methods to facilitate the increase in extrusion, deposition and/or sintering speed in three-dimensional printing, such as in fused filament fabrication, laser sintering or other methodologies. Through the use of multiple nozzles on a print head, more material is deposited. By including nozzles sufficient for a side of a page or planar element of an object design, the material deposition for an entire plane or layer is done in one pass of the print head. Likewise, through the employment of multiple lasers, energy sources and/or beam splitters, more material can be processed, such as by laser sintering.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

As discussed, various techniques for three-dimensional printing have been developing for a few decades. For example, stereolithographic methodologies have been known since about 1984, and involve the accretion of layers by adding cured photopolymers, which are usually cured by ultraviolet light. Lasers and other energy sources are employed to cure or harden the object in situ, i.e., within a container or vat of uncured or liquid material, which serves as a support for the cured material constituting the object, enabling more complicated structure formation.

Another technique involves sintering or melting, which is usually used in metalworking. Prior to these techniques, metalworking involved casting, fabrication, stamping and machining, such as on a lathe or other subtractive process. Through these three-dimensional printing techniques, rapid prototyping or on-demand manufacturing have been made easier, where currently sophisticated parts manufacture have become possible, driving a transformation in the job market for metal workers. Indeed, the rise of desktop manufacturing and rapid manufacturing, successor industries, are becoming increasingly prominent.

It should, of course, be understood that a major use of the technology set forth in the instant invention is directed to the use of additive manufacturing techniques involving deposition layering, including various chemical deposition with light energy hardening, molten material deposition, powders with heat and glue deposited, and more. Nonetheless, the multiple throughput aspects of the instant invention are applicable in each of the various three-dimensional printing techniques, and each will be described in more detail hereinbelow.

As mentioned hereinabove, each of these three-dimensional printing techniques represents a paradigm shift from the subtractive removal process of most current manufacturing technologies, such as machining, where material is removed to form or craft an article. The new techniques, collectively termed additive manufacturing, are transforming the entire manufacturing process, with limitations boundless to human imagination.

However, as with any technological revolution, certain bottlenecks exist to hinder the growth of these additive techniques, such as in the fused deposition modeling (FDM) or method of 3D printing, also known as fused filament fabrication (FFF), where printing speed is limited by the speed at which the construction or building material can be extruded from the nozzle. As discussed, current additive manufacturing techniques employ a single nozzle in a print head, with the print head moving point by point and line by line across a page or plane of CAD models, then on to the next page or plane, where the print head moves point by point, depositing a bead of melted material, and line by line and so on. Naturally, this point-by-point and line-by-line process is quite slow, even with robust machinery to rapidly move the print head and other components to each X, Y coordinate on a build platform, surface or other framework. Accordingly, ways to increase the speed of printing are necessary to better facilitate the employment of three-dimensional printing.

Figure 1A:
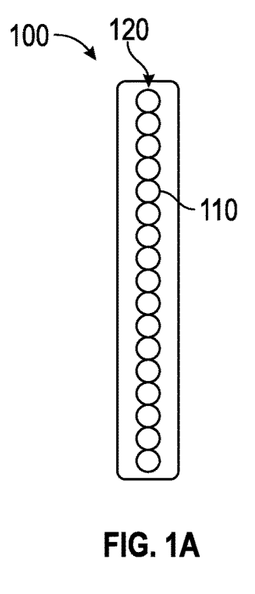
FIG. 1A is a schematic view of a three-dimensional printer extrusion device, system and methodology configuration pursuant to a first embodiment of the present invention, illustrating a row or array of nozzles.
Figure 1B:
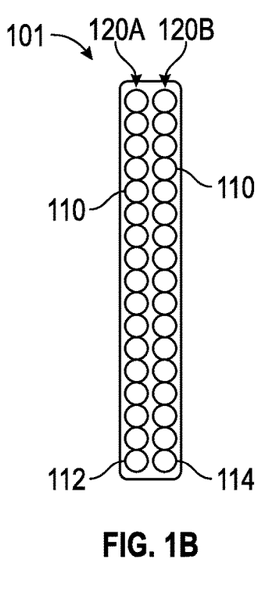
FIG. 1B is a schematic view of a three-dimensional printer extrusion device, system and methodology configuration pursuant to another embodiment of the present invention, illustrating a nozzle having two rows or arrays, such as the row shown in FIG. 1A.
Figure 1C:
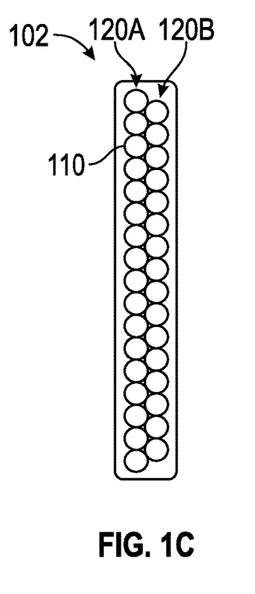
FIG. 1C is a schematic view of a three-dimensional printer extrusion device, system and methodology configuration pursuant to still another embodiment of the present invention, illustrating a nozzle having two rows or arrays, such as shown in FIG. 1B, but where the rows are staggered or offset relative to each other.

With reference now to FIGS. 1A, 1B and 1C of the DRAWINGS, there are illustrated therein general schematic views of a print head, generally designated by the reference numerals 100, 101 and 102, respectively, which may be employed to implement principles of the present invention in a first embodiment thereof, in particular in an additive manufacturing process involving deposition layering.

As shown in the embodiment of FIG. 1A, print head 100 has a number of nozzles, generally designated by the reference numeral 110, each employed to deploy, deposit or extrude material, as is understood in the art. In this embodiment of the present invention, an array of such nozzles are deployed, generally designated by the reference numeral 120. Printing speed can thus be greatly increased by replacing the single nozzle of prior art devices with a print head 100 having a linear array 120 of nozzles aligned, for example, along the Y axis of an X, Y coordinate system along a build platform or surface, as discussed in more detail in connection with FIG. 3. It should be understood, however, that the array 120 need not be linear but may be staggered or offset from one another, as illustrated and discussed further in connection with FIG. 1C.

Figure 3:
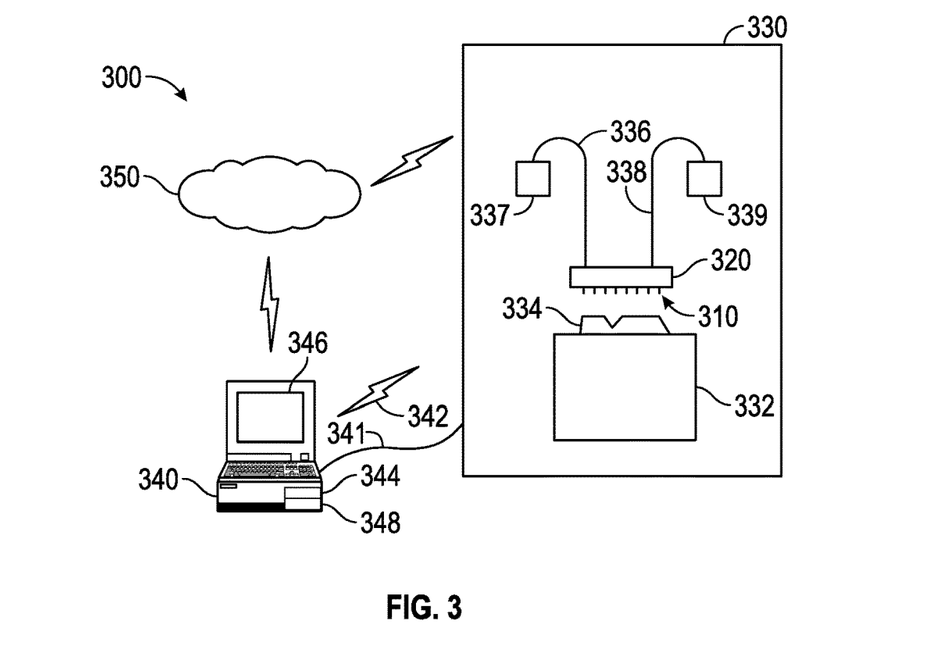
FIG. 3 is a diagrammatic view of an extrusion-based three-dimensional printer device and system pursuant to the teachings of the instant invention, employing extrusion head devices, such as shown in FIGS. 1A-1C and as deployed in FIG. 2.

As discussed, the print head 100 should be of sufficient length to cover the area of the platform on which the object is to be constructed in one pass, e.g., across the Y dimension, as described further in connection with FIG. 3. The print head 100 in this embodiment would be moved across the platform, alternately from left to right and right to left, as is understood in the art, to deposit the material. Thus, instead of point-by-point movement across the plane of a particular layer, as with prior art devices and techniques, the present invention moves line by line, covering considerable more area and reducing the overall movement required by the mechanism, thereby reducing potential downtime as a result of repair.

It should be understood that the deposition from each respective nozzle would be separately controlled by a computer, as shown and described in FIG. 3, although the nozzles 110 would preferably take material from a common reservoir, such as molten material fed by a single filament, as also shown and described in connection with FIG. 3. It should, of course, be understood that in other embodiments the nozzles 110 could deposit multiple materials in each pass, with the respective nozzles 110 being dedicated to one material or configured to accept and deploy two or more feeds. Such an arrangement would also be capable of laying down an entire layer or plane of materials in a single pass of the print head 100 across the field of operation or build platform of the apparatus, instead of the necessity for exchanging the print head 100 and making another run over the surface to deposit additional or alternate material, e.g., in electronics fabrication techniques.

With reference now to FIG. 1B of the DRAWINGS, there is shown a print head 101 also with a plurality of the aforesaid nozzles 110, such as described and illustrated in connection with FIG. 1A. However, the nozzles 110 in this embodiment are arranged or configured in two rows, generally designated by the reference numerals 120A and 120B, respectively. Printing speed can thus be further increased by replacing the single nozzle of prior art devices with a print head 101 having a linear array of two rows of nozzles, 120A and 120B, aligned in parallel, for example, along the aforementioned Y axis, and of sufficient length to cover the area of the platform on which the object is to be constructed, i.e., along the corresponding X axis. In operation, the print head 101 would deposit material, e.g., a polymer described in more detail hereinbelow, along the two rows, then move the equivalent of two spaces or two granular-sized spaces, as described in more detail hereinbelow, deposit two rows again, and so forth. To avoid interference of the rows to each other, the print head 101 in this embodiment may lift slightly in the Z direction, and then move to the next X, Y or just X coordinate to deposit the next row, lower for that operation, and then repeat.

With reference to FIG. 1C of the DRAWINGS, there is shown another print head 102 with the two rows of nozzles 110 configuration, as illustrated in FIG. 1B, but with the rows or arrays 120A and 120B interlaced or offset from each other instead of being in parallel, as discussed hereinabove. It should be understood that the individual nozzles 110, being offset from each other, may create an operational advantage over the technique shown and described in connection with FIG. 1B in allowing the print head 102 to deposit the respective material for both rows. The print head 102, because of the offsetting or interleaving of the respective nozzles 110, may not have to rise or otherwise avoid interference, and instead rise only the minimum necessary, such as to avoid another depositions of prior rows, which could be an issue for the embodiment shown in FIG. 1B. Further, the interleaving, interlocking nature of the depositions in this embodiment may lead to increased structural properties, e.g., no clear planes to cleave the resultant object. In this way, the process speed may be increased over that of the device shown in FIG. 1B, and the underlying object being created may be strengthened.

Figure 2:
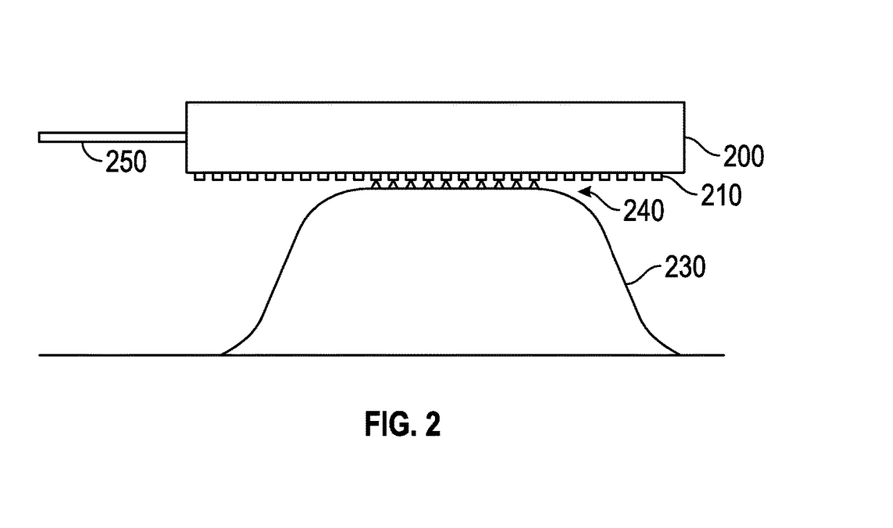
FIG. 2 is an exemplary operative configuration of a three-dimensional printer extrusion device, such as shown in FIGS. 1A, 1B and 1C.

With reference now to FIG. 2 of the DRAWINGS, there is shown an operational print head 200 with a number of nozzles 210, such as arrayed as shown and described in connection with the embodiments shown in FIGS. 1A, 1B and/or 1C, although other configurations are possible. With each planar or layer pass, e.g., along the aforementioned Y dimension (perpendicular to the drawing sheet) across an X, Y coordinate field or plane, the respective nozzles 210 deposit material line by line onto an object form, generally designated by the reference numeral 230, thereby accreting upon and building up the object, via certain nozzles 210 in that pass depositing material, the deposition operation generally designated by the reference numeral 240.

The print head 200 mechanism is affixed to a framework, described in more detail in connection with FIGS. 3 and 4 hereinbelow, and controlled by a computer, a connection to which is generally designated by the reference numeral 250, and also described further hereinbelow in connection with FIGS. 3 and 4. In this fashion, the print head 200 moves back and forth (or left to right or right to left), pursuant to computer or processor control, to cover the previous layer deposited per the object form, program or method, i.e., the blueprint of the object design, including the layer-by-layer commands for deposition of materials, which, of course, vary according to the deposition or additive technique employed, the particular material employed and the particular additive fabrication machine or device used, as described in more detail hereinbelow.

It should be understood that the increase in printing speed resulting from the solutions set forth in the present invention is proportional to the number of nozzles 110/210 in the print head 200. It should further be understood that the illustrations of the print heads 100/101/102/200 in the instant Specification are merely representative of the actual number of nozzles 110/210 that may be employed in the configurations of the present invention, as discussed in more detail hereinbelow. With increases in miniaturization, the actual number of nozzles 110/210 could be quite large, and vary greatly with the desired granularity or degree of fineness required in the production or the reproduction of an object 230.

With reference now to FIG. 3 of the DRAWINGS, there is shown an exemplary fabrication system as may be employed in using various three-dimensional printing techniques pursuant to the teachings of the instant invention, generally designated by the reference numeral 300. A fabrication machine, generally designated by the reference numeral 330, is shown in communication with a computer, generally designated by the reference numeral 340. As shown, the computer 340 can interact with the machine 330 directly, e.g., through a wireline connection, generally designated by the reference numeral 341, wirelessly, generally designated by the reference numeral 342, or through an Internet connection or cloud, generally designated by the reference numeral 350, the particular means for which are understood in the art. In other words, a user may run the machine 330 from the computer 340 directly or remotely.

It should be understood that the computer user has a program that is representative of the shape of the desired component or object to be constructed layer by layer, by whatever technique described in the instant invention. Conventional CAD programs require the commands or code for a model to be in a particular format, e.g., .STL or .OBJ, before printing. In initializing the code, there is a "fixup" stage where the code is analyzed to ascertain whether surfaces connect properly, and can thus be printed; otherwise, the fixup is done. In other words, the topography of the structure or object is determined, the respective lines, planes, and curves needed for that shape calculated, and the approach for digitalization ascertained.

At this point, the code is processed by a slicer, which, as its name suggests, slices the digital model into a series of thin layers, and produces so-called G-code tailored to a particular type of three-dimensional printer, such as FDM printers. The various code, commands and data are stored in a memory, generally designated by the reference numeral 344. The software generally includes a viewer program, such that the entire three-dimensional printing process can be observed, whereby the particular approach taken can be evaluated, e.g., FDM may not be the best way to reproduce the object because of the topography, e.g., overhanging structures, where another approach or technique, such as stereolithography, may be better suited. Alternatively, the angle or aspect in depositing the material can facilitate the entire process, i.e., digitizing or slicing the object at an oblique or acute angle may render a particular deposition approach tractable, more feasible, quicker, cheaper, stronger, or other measure. Through analysis on the aforesaid viewer, such as displayed on a display 346 of the computer 340, fabrication pathways to produce the part or object can be ascertained and honed in advance, and a particular or optimal pathway or steps determined, pursuant to a particular printing technique, material used, aspect angle and other considerations.

In the embodiment shown in FIG. 3, fabrication machine 330 is an additive manufacturing device, e.g., employing a deposition layering technique. As shown, the machine 330 has a build platform or surface, generally designated by the reference numeral 332, upon which the object or part being fabricated, generally designated by the reference numeral 334, rests. As shown in FIG. 3, the present invention employs a multi-headed nozzle, as described hereinabove in connection with FIGS. 1A-1C and 2, such as an extrusion head, generally designated by the reference numeral 320, has a plurality of the aforedescribed nozzles, generally designated by the reference numeral 310 arranged along a lower surface thereof, and facing said build platform 332, as well as the object 334 thereon. As described, the extrusion head 320 has a width or dimension, such as along the X axis, that encompasses one dimension for the object 334, i.e., the extrusion head 320 makes a single pass along that corresponding axis, e.g., along the Y axis, with the nozzles 310 depositing (or not) in each pass, as programmed and run by the computer 340, e.g., using a general or specialized processor therefor, generally designated by the reference numeral 348. Accordingly, movement of the extrusion head 320, controlled by the computer 340, can be actuated through various pistons and other components to properly position the extrusion head 320 and the respective nozzles 310 over the object 334.

Although the extrusion head 320 shown in FIG. 3 is raised above the operational field of the platform 332, i.e., the upper surface upon which the object 334 rests, the head 320 is lowered to just above the last layer deposited in the formation of the object 334. It should also be understood that instead of the processor In a particular pass, a so-called build material may be deposited. In this embodiment, the build material may be composed of a number of different polymers or thermoplastics, including acrylonitrile butadiene styrene (ABS), polycarbonate (PC), polylactic acid (PLA), high density polyethylene (HDPE), PC/ABS, polyphenylsulfone (PPSU) and high impact polystyrene (HIPS). It should, of course, be understood that alternative polymers or thermoplastics may also be deployed in practicing the principles of the present invention.

As illustrated in this embodiment, the polymer may be in the form of a filament, generally designated by the reference numeral 336, which may be fed from a hopper, generally designated by the reference numeral 337. The filament 336 feeds through the extrusion head 320, and is melted or liquefied for deposition through the respective nozzles 310, e.g., made ready for the deposition, after which the deposited material cools and bonds to the substrate and hardens, leaving a new layer, and, in turn, becoming the substrate for a next layer thereupon. As some techniques employ a support material for some fabrications that may be delicate or unbalanced in the process, e.g., overhanging or other delicate structures, a support material line, generally designated by the reference numeral 338, is shown which provides material for support, such as from another hopper, generally designated by the reference numeral 339. It should be understood that additional hoppers may be present, holding the same building material, but having a different consistency, such as for finer or coarser construction, other building materials, or other stabilizing or support materials.

As discussed, it should also be understood that a number of three-dimensional printing techniques can employ principles of the present invention, such as binder jetting techniques; directed energy disposition techniques, such as electron beam direct manufacturing, ion fusion formation, and laser powder forming; light photo-polymerization techniques, such as digital light processing and stereolithography; material extrusion techniques, such as fused deposition modeling described hereinabove; material jetting techniques; powder bed fusion techniques, such as direct metal laser sintering, electron beam melting, selective heat sintering, selective laser melting and selective laser sintering; and sheet lamination techniques, such as laminated object manufacturing and ultrasonic additive manufacturing. The principles of the present invention thus enable the leveraging of existing techniques to increase the throughput for each of the various three-dimensional printing methodologies described herein.

It should also be understood that the granularity or size of the nozzles 110/210/310 is dependent on a variety of factors and the techniques employed. For exemplary purposes, such as in the aforesaid fused deposition modeling, the three-dimensional or 3D dots are around or about 50 to 100 μm in diameter. For other technologies, it should be understood that the nozzle size can be about 15-25 μm, 20-40 μm or other measures, which will in time, of course, be reduced as this technology matures to about 5-10 μm. Thus, presently-desirable ranges for the nozzles are about 5-10 μm, about 15-25 μm, about 20-40 μm, about 40-60 μm, about 50-100 μm, and combinations thereof, e.g., where the head 120/220/320 handles multiple materials.

For fused deposition modeling, such as thus illustrated and depicted herein, if about 100 μm is used, for example, this can provide an estimate of the number of nozzles 110/210/310 for the respective head 120/220/320. Taking 10 cm as a conservative estimate of the width of the active or operative area of the build platform 332, i.e., a plane or layer dimension as discussed, a conservative estimate the number of nozzles 110/210/310 in the print head 120/220/320 is at least a thousand (which is a number quite larger than the representative number of nozzles 110/210/310 shown in FIGS. 1 and 2), resulting in a potential thousand fold increase in printing speed using the principles of the instant invention.

It should be understood that one practicing the principles of the present invention may employ the nozzles 110/210/310 in a variety of alternate configurations, e.g., three or more rows, interlaced rows, curved nozzle heads, etc. It should also be understood that the line-by-line deposition technique set forth herein can also be employed in further alternate configurations, such as where the print heads 120/220/320 cover a fraction of the plane or layer or X direction in question in each pass, with the position of the print head 120/220/320 adjusted or offset for multiple runs or passes across a given plane or layer, e.g., across the Y dimension on the build platform. For example, with a print head 120/220/320 one half the size of the planar dimension for the operative area, e.g., the Y axis, extending across the top of the platform 332, two runs across the Y dimension (which in the examples shown extends along the aforesaid surface of platform 332 into the drawing sheet) would be needed to cover that plane. If one third, then three runs, and so on. Such multiple passes instead of the preferred single pass, may also allow for finer material depositions, such as in an alternate embodiment of the present invention, where various discrete heads may be interchanged, e.g., pursuant to computer control to best effectuate a fabrication. In any event, the divisor herein would nonetheless be a smaller number than the total number of lines crossed by current conventional techniques in their point-by-point runs.

As discussed, it should be understood that an additive device, or other device pursuant to the present invention, could be in kit form and could include a variety of print heads 120/220/320, in a variety of configurations that could be interchanged for particular usages, as is understood in the art. For example, a coarse head count granularity can be employed in object form sections that do not require precision, and print heads 120/220/320 with finely spaced nozzles 110/210/310 could be swapped in for the object portions requiring precision. In this fashion, the needed object can be created in a fraction of the time compared to present day three-dimensional printing systems.

As discussed, the print head 120/220/320 could also include nozzles varying in fineness, materials, amounts and other measures, e.g., with the embodiment shown and described in connection with FIG. 1B, a nozzle 112 could extrude a small amount of the material for fine work, and the adjacent nozzle 114 could extrude (or perhaps the entire row 120A also) alternate amounts of the same or different materials. In this fashion, the fabrication techniques and machines, pursuant to the teachings of the present invention have greater facility and versatility over the prior art.

Similar to the aforementioned improvements in the processing speed due to increased print head capacity, throughput for other three-dimensional printing techniques, such as selective laser melting (SLM), selective laser sintering (SLS), direct metal laser sintering (SMLS) (and other lasering techniques), along with stereolithography can also be increased by the addition of more lasers, laser beams or other energy dispersal means operable on a treatment surface or volume. Even though lasers operate at light speed, the mechanisms employed to maneuver the lasers and guide them do not. Just as with the aforesaid additive processes, the choreography of multiple lasers or multiple discrete beams across a plane of material, e.g., uncured material, would increase the speed of the three-dimensional printing process for these types of three-dimensional fabrication processes.

Figure 4:
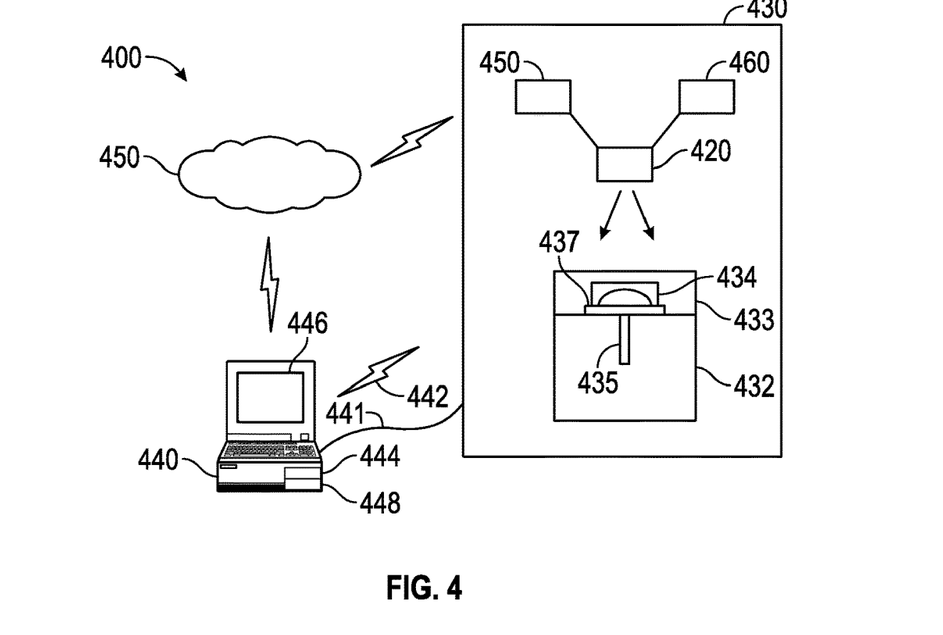
FIG. 4 is a diagrammatic view of an energy-based three-dimensional printer device and system pursuant to the teachings of the instant invention, employing components, such as laser or energy sources, optics and other devices to deploy multiple energy beams.

With reference now to FIG. 4 of the DRAWINGS, there is shown an exemplary fabrication system, such as may be employed in using various energy-based three-dimensional printing techniques, generally designated by the reference numeral 400. A fabrication machine, generally designated by the reference numeral 430, is shown in communication with a computer, generally designated by the reference numeral 440. As shown, the computer 440 can interact with the machine 430 directly, such as via a wireline, generally designated by the reference numeral 441, wirelessly, generally designated by the reference numeral 442, or through an Internet connection or cloud, generally designated by the reference numeral 450. In other words, a user may run the machine 430 from the computer 440 directly or remotely.

As discussed in connection with FIG. 3, the various code, commands and data are stored in a memory, generally designated by the reference numeral 444. It should, of course, be understood that the type of memory may vary, as well as the location, e.g., some of the data may reside elsewhere, such as in a hard drive attached to the computer 340 or perhaps in the cloud 350. As is understood in the art, a resident run program or the like is employed to translate the stored digital commands into the actions, e.g., turning some nozzles on and off, running a laser or other energy beam across an operational field containing a fluid medium, and other actions, to ultimately, after many passes, create the object 434 from those stored plans, pursuant to a programmer's vision of the code.

As shown in FIG. 4, laser and other energies, such as ultraviolet light, are employed to cure or otherwise harden a more pliant, soft or liquid material. As with the fabrication machine in FIG. 3, there is illustrated herein a fabrication machine 430, which has lasers or energy emitters to treat a material. As shown, the machine 430 has a build platform or surface, generally designated by the reference numeral 432, and a container or vat, generally designated by the reference numeral 433, thereon. As discussed, a liquid polymer, such as a photo-polymer, is contained in the vat 433 and preferably exposed to controlled lighting under safelight conditions. With the exposure to energy, the exposed liquid polymer hardens. As discussed, the light energy or laser energy in the prior art is focused on points, delivering sufficient energies to the materials thereat to photopolymerize it, forming a substrate, which, as discussed, upon which other material is transformed thereon.

As also shown in FIG. 4, an object being manufactured, generally designated by the reference numeral 434, which in this exemplary embodiment is an arch with two bases, is built by forming the two bases of the object 434, and building thereupon and eventually joining the two intermediate structures so formed into the arch 434 shown. Also shown in FIG. 4 is a piston or other riser device, generally designated by the reference numeral 435, which is attached to an interior platform, generally designated by the reference numeral 437, within the vat 433 and upon which the object 434 rests. Pursuant to programming control and monitorings of the build process, the piston 435 alternatively raises the interior platform 437 and object 434 out of the polymeric material for energy treatment, after which the piston 435 lowers the object 434 back into the vat 433 to coat the next area for the energy treatment. In time, the object 434 is fully constructed and then removed from the vat 433, such as by draining.

As discussed, the embodiment shown in FIG. 4 encompasses a variety of energy-based curing treatments. For example, an energy dispersal head, generally designated by the reference numeral 420, contains components therein to disperse the energies at hand onto the uncured material to form the object 434, as described. For laser energies, a laser source 450 is shown, where the beam therefrom enters the energy dispersal head 420, which contains optical splitters therein to divide the input laser beam into a plurality of discrete beams. The computer, particularly a processor 448 therein, manages the tracks of the various beams and the treatment. A second energy source is also shown, generally designated by the reference numeral 460. If the source 460 is another laser, then the two input lasers, which could be of the same or different strengths and/or wavelengths, can be otherwise merged or combined into the treatment of the material surface with a multiplicity of beams, the control of which is by the computer 440, which splits or otherwise divides the beam into two or more discrete beams to treat the surface material. It should, of course, be understood that hundreds or thousands of discrete simultaneous or substantially simultaneous beams, preferably numbering in the ranges of 100-10,000, 50-5,000, 30-3,000, 20-2,000, 10-1,000 and other ranges, as is understood by those of skill in the art.

Also, as with FIG. 3, the energy dispersal head 420 is shown above the operational field of the platform 432. Unlike the embodiments shown hereinabove, the technique here is to operate via multiple energy beams across the operational field, such as to spot cure particular but disparate points along respective lines of the material within the vat 433, ultimately crisscrossing the operational field, e.g., the aforesaid curable liquid medium, and constructing the object 434 through such multiple sinterings, meltings, etc., with the raw material acting as a support.

Through the use of multiple beams, multiple lasers and/or multiple energy sources, a plurality of points are treated simultaneously or substantially simultaneously. For example, under computer control, a number of discrete beams may be trained across various points along a contour line of a surface form, instead of one beam hopping point to point along that contour line. Unlike the more static or coordinate system-based methodology of the aforementioned deposition techniques, the sheer rapidity and versatility of beam splitting and optics makes the usage of dozens, hundreds or thousands of discrete simultaneous or substantially simultaneous beams possible. It should thus be understood that although only two such beams, generally designated by the reference numeral 439, are shown in FIG. 4, the actual number of beams or discrete energies emitted are contemplated to be much higher. With this multi-laser technique, fabrication processes with materials requiring different laser energies can be processed quickly, instead of swapping out lasers or engaging in recalibrations and re-runs. The principles of the present invention open the polymer treatment process up to alternative approaches, enabling the construction or speeded construction of new materials, offering significant advantages over the art.

It should, of course, be understood that alternate energy sources are also contemplated. For example, the source 460 could be an ultraviolet wavelength, X-ray or other energy source, and the energies passing through the energy dispersal head 420 disperse that energy in a wider fashion than the rather rigid point by point prior art technique, such as a line-by-line approach or with enough optics, handling the entire plane of material available for treatment quickly, effectively operating as a digital mask work. Of course, the energy dispersal head 420 may vary the energies so dispersed on a beam-by-beam basis, enabling complicated curing or other treatments. It should be understood that the computer 440 preferably handles the entire treatment once the user has ascertained the best approach, i.e., the treatment is automatic and the beams crisscross or traverse the plane of the treatment area to form the object therein along multiple fronts.

It should be understood that the principles of the present invention have a wide use across many three-dimensional printing applications, as befits the disruptive nature of this technology. Clothes and other apparel, footwear, eye glasses and numerous other personal use-type applications employ the techniques of the present invention, and can benefit thereby. The principles of the present invention are, of course, open to numerous commercial applications as well.

The automobile and machinery parts industries, for example, have been radically transformed as a result of this technology, with virtually all parts of cars and other mechanical equipment being so produced. Indeed, virtually all tools and most equipment in everyday life can be replicated using three-dimensional printing applications. Also, for all parts and components, the techniques of the instant invention are fully capable of preparing a mold or form for a part, such as where that mold can be employed to cast the part in metal or other material instead of directly fabricating the part. For example, the creation of a time-consuming mold can be left to the printer, and the later casting from that mold can be duplicated many times and much faster using another technology. The instant invention is, therefore, capable of leveraging existing techniques and technologies in countless ways.

In addition to the terrestrial building construction industries, the three-dimensional printing techniques of the present invention would also have use on the Moon or Mars using and re-using the local materials. Likewise, the techniques of the instant invention would have applicability in space material fabrications, albeit due to the lack of gravity the techniques would be adapted thereto.

The improved techniques of the present invention can also be employed in the medical, medical device and biological arenas, where the medium is far different but the methodologies the same. For example, in connection with FIGS. 3 and 4, bio-print replacements or tissue can be constructed using an extruder of cells or other living material to form organs, body parts and other biological-based structures. Thus, hearts, livers and other organs can, with proper protocols, be manufactured, representing a monumental leap in the life sciences and for humanity.

Similarly, the present invention can be employed in the food industry to construct new and unique foods, such as a cakes and confections, as well as more substantive food, where the source materials would, of course, radically differ from those in the techniques described more fully herein. For example, using a fabrication machine such as the device 330/430, along with hoppers and extrusion-type heads 200, biological and food products can be manufactured, and through the improvements of the instant invention, those products can be produced faster than any prior art technique.

With the growth of this industry, three-dimensional printing represents the next sea change in the industrial world. Akin to the commercial and societal transformations in the wake of the steam engine, a multitude of applications of this new technology will revolutionize the way we all live. The instant invention is an approach to making significant improvements on this new paradigm, making the extraordinary advantages of the three-dimensional printing movement even more palpable to everyone.

Preferred systems, configurations, methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A three-dimensional printer comprising:
   a print head, said print head positioned over an operational area;
   a plurality of nozzles attached to said print head, a material extruded therefrom employed to form an object; and
   a processor, said processor configured to control the position of said print head over said operational area during the formation of said object, and configured to control the respective nozzles and the flow of said material therethrough,
   wherein at least two of said nozzles, each independently controlled by and at the command of said processor, extrude material together in the formation of said object,
   wherein said at least two of said nozzles together extrude material over separate areas of said operational area,
   wherein the number of said plurality of nozzles on said print head is within the range of about 10-10,000; and
   wherein said operational area has substantially rectilinear dimensions, said print head having a length substantially equivalent to one of said substantially rectilinear dimensions, said plurality of nozzles configured on said print head across said one of said substantially rectilinear dimensions, said print head moving across said operational area in one pass for one layer.

2. The three-dimensional printer according to claim 1, wherein said nozzles have a diameter within the range selected from the group consisting of about 5-10 μm, about 15-25 μm, about 20-40 μm, about 40-60 μm, about 50-100 μm, and combinations thereof.

3. The three-dimensional printer according to claim 1, wherein the number of said plurality of nozzles on said print head is within the range selected from the group consisting of about 100-10,000, about 50-5,000, about 30-3,000, about 20-2,000 and about 10-1,000.

4. The three-dimensional printer according to claim 1, wherein said plurality of nozzles on said print head are arranged in row.

5. The three-dimensional printer according to claim 4, wherein said plurality of nozzles on said print head are arranged linearly in at least two rows.

6. The three-dimensional printer according to claim 1, wherein said plurality of nozzles on said print head are arranged offset.

7. The three-dimensional printer according to claim 1, wherein said material extruded from said nozzles is selected from the group consisting of acrylonitrile butadiene styrene (ABS), polycarbonate (PC), polylactic acid (PLA), high density polyethylene (HDPE), PC/ABS, polyphenylsulfone (PPSU), high impact polystyrene (HIPS) and combinations thereof.

8. The three-dimensional printer according to claim 1, wherein said print head length is less than said one of said substantially rectilinear dimensions, said print head moving across said operational area in multiple passes.

9. The three-dimensional printer according to claim 8, wherein said print head length is an integer fraction of said one of said substantially rectilinear dimensions.

10. The three-dimensional printer according to claim 1, wherein said print head has a length and width substantially equal to said substantially rectilinear dimensions for said operational area, said plurality of nozzles arranged in an array across said print head and, at the command of said processor, a plurality of said nozzles extruding material together in the formation of one layer of said object.

11. The three-dimensional printer according to claim 1, wherein said print head is interchangeable with a second print head, said second print head having a different configuration of said plurality of nozzles.

12. A print head for a three-dimensional printer comprising:
a body;
a plurality of nozzles attached to said body, a material extruded therefrom employed to form an object;
said print head configured, at the command of a processor, to position over an operational area and to extrude material from at least two of said nozzles together to form said object,
wherein said processor is configured to control the respective nozzles and the flow of said material therethrough,
wherein said at least two of said nozzles extrude material together over separate areas of said operational area,
wherein the number of said plurality of nozzles on said body is within the range of about 10-10,000; and
wherein said operational area has substantially rectilinear dimensions, said print head having a length substantially equivalent to one of said substantially rectilinear dimensions, said plurality of nozzles configured on said print head across said one of said substantially rectilinear dimensions, said print head moving across said operational area in one pass for one layer.

13. The print head according to claim 12, wherein said nozzles have a diameter within the range selected from the group consisting of about 5-10 μm, about 15-25 μm, about 20-40 μm, about 40-60 μm, about 50-100 μm, and combinations thereof.

14. The print head according to claim 12, wherein the number of said plurality of nozzles on said print head is within the range selected from the group consisting of about 100 10,000, about 50-5,000, about 30-3,000, about 20-2,000 and about 10-1,000.

15. The print head according to claim 12, wherein said plurality of nozzles on said print head are arranged in a row.

16. The print head according to claim 15, wherein said plurality of nozzles on said print head are arranged linearly in at least two rows.

17. The print head according to claim 12, wherein said plurality of nozzles on said print head are arranged offset.

18. The three-dimensional printer according to claim 12, wherein said print head length is less than said one of said substantially rectilinear dimensions.

19. The three-dimensional printer according to claim 18, wherein said print head length is an integer fraction of said one of said substantially rectilinear dimensions.

20. The three-dimensional printer according to claim 12, wherein said print head has a length and width substantially equal to said substantially rectilinear dimensions for said operational area, said plurality of nozzles arranged in an array across said print head, and, at the command of said processor, a plurality of said nozzles extruding material together in the formation of one layer of said object.

21. A three-dimensional printer comprising:
an energy dispersion head;
a plurality of energy dispersion components within said energy dispersion head, respective beams of energy emitted therefrom onto an operational area employed to form an object,
wherein material for said object is deposited onto said operational area by at least one nozzle;
a processor, said processor configured to control depositing said material onto said operational area, and configured to control the position of said respective beams of energy over said operational area during the formation of said object,
wherein at least two of said beams of energy, at the command of said processor, operate together in the formation of said object,
wherein said processor controls the respective beams of energy, said processor controlling the position and intensity of each said beam of energy,
wherein at least two of said beams of energy, at the command of said processor, operate over separate areas of said operational area in the formation of said object, and
wherein the number of said respective beams of energy from said plurality of energy dispersion components over said operational area is within the range of about 10-10,000.

22. The three-dimensional printer according to claim 21, wherein said respective beams of energy are from respective lasers.

23. The three-dimensional printer according to claim 21, wherein said respective beams of energy are split from a laser beam.

24. The three-dimensional printer according to claim 21, wherein said respective beams of energy have different wavelengths.

25. The three-dimensional printer according to claim 21, wherein at least one beam of energy is ultraviolet.

26. The three-dimensional printer according to claim 21, wherein said processor controls said printer pursuant to a model selected from the group consisting of fused deposition modeling, material jetting, powder bed fusion, direct metal laser sintering, electron beam melting, selective heat sintering, selective laser melting, selective laser sintering, sheet lamination, laminated object manufacturing, ultrasonic additive manufacturing and combinations thereof.

27. An energy dispersion head for a three-dimensional printer comprising:
a body;
a plurality of energy dispersion components attached to said body, respective beams of energy emitted therefrom across an operational area and employed to form an object,
wherein material for said object is deposited onto said operational area by at least one nozzle;
said energy dispersion head configured, at the command of a processor, to emit at least two of said beams of energy together to form said object during a pass over said operational area,
wherein said processor is configured to control depositing said material onto said operational area, and configured to control the respective beams of energy and their positioning, said processor configured to control the position and intensity of each said beam of energy,
wherein at least two of said beams, at the command of said processor control, operate over separate areas of said operational area during said pass, and wherein the number of said respective beams of energy from said plurality of energy dispersion components over said operational area is within the range of about 10-10,000.

28. The three-dimensional printer according to claim 21, wherein the number of said respective beams from said plurality of energy dispersion components over said operational are selected from the group consisting of about 50-5,000, about 30-3,000, about 20-2,000 and about 10-1,000.

* * * * *